Feb. 11, 1969 E. ERLBACH 3,427,091
ALTERATION OF TRANSMITTANCE IN SOLIDS
Filed Aug. 14, 1964
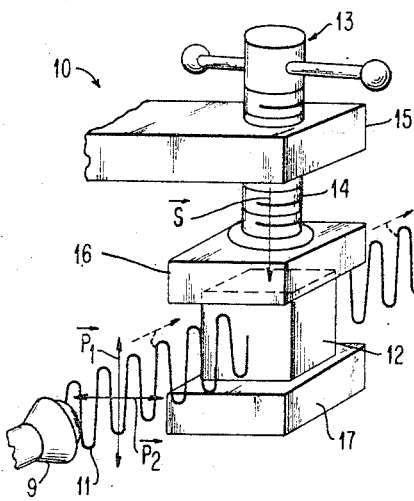
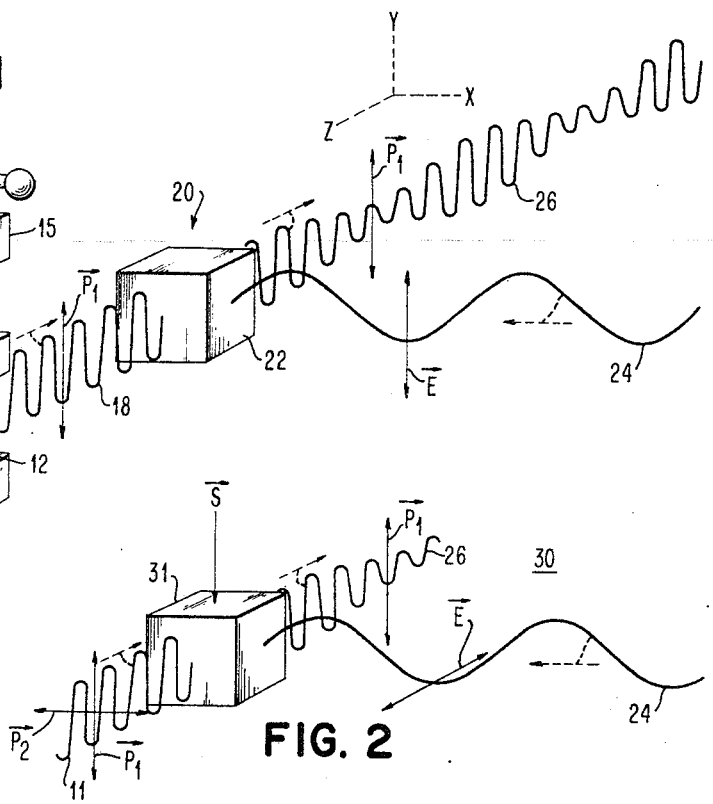
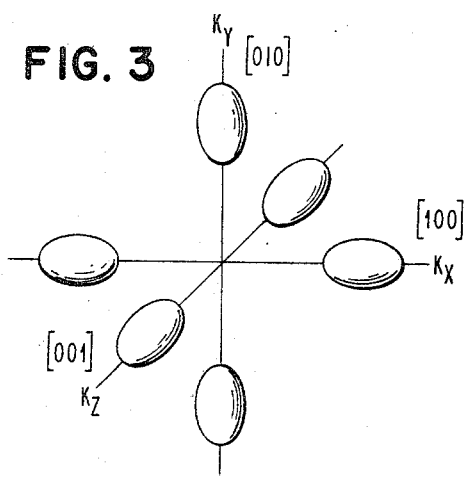
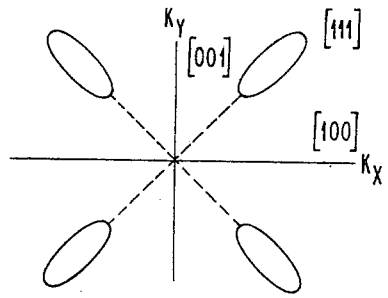
INVENTOR
ERICH ERLBACH
BY *Bernard N. Wiener*
ATTORNEY

United States Patent Office 3,427,091
Patented Feb. 11, 1969

3,427,091
ALTERATION OF TRANSMITTANCE IN SOLIDS
Erich Erlbach, New York, N.Y., assignor to International Business Machines Corporation, New York, N.Y., a corporation of New York
Filed Aug. 14, 1964, Ser. No. 389,589
U.S. Cl. 350—149                                11 Claims
Int. Cl. G02f *1/24*

ABSTRACT OF THE DISCLOSURE

Alteration of the transmittance of electormagnetic radiation propagating in a solid, the radiation having wavelength longer than an energy gap in the solid, is obtained by changing the energy distribution of free charge carriers therein in selected ones of several energy valleys in the solid. The change may be obtained by application of either stress or electric field to the solid. Stress is applied to a monocrystalline semiconductor solid in a preferred crystal direction to populate preferentially selected ones of energy valleys therein with free charge carriers. Electromagnetic radiation propagating in the solid, the radiation having wavelength longer than an energy gap in the solid, is linearly polarized by selective absorption of all but one direction of the polarization components. A time varying electric field is applied to a monocrystalline semiconductor solid to heat preferentially free charge carriers therein in selected ones of several energy valleys. Linearly polarized electromagnetic radiation propagating in the solid, the radiation having wavelength longer than an energy gap in the solid, is amplitude modulated by absorption thereof in accordance with the amplitude of the electric field. In particular, the time varying electric field is linearly polarized microwave radiation.

---

This invention relates to alteration of transmittance in solids and it relates more particularly to apparatus and method for altering the transmittance of electromagnetic radiation propagating in a semiconductor solid.

The transmittance of radiation propagating in a body is the ratio of the radiant power transmitted by it to the total radiant power which entered it. It has been discovered for the practice of this invention that the multivalley energy structure of a monocrystalline semiconductor solid may be utilized conveniently for altering the transmittance of electromagnetic radiation propagating therein. For such a solid, there are several constant energy surfaces, ellipsoidal in form, representative of the energy valleys. By application of alteration means to the crystal in a particular crystal direction, free charge carriers are established in selected ones of several energy valleys. As a consequence, the absorption is changed for radiation having wavelength longer than the energy gap in the solid. Since the transmitted radiant power is altered in comparison with the incident radiant power, the transmittance is altered.

Illustrative literature references which present material of interest with regard to the physics of the operation of the invention are:

(a) Book, Introduction to Solid State Physics, second edition, by C. Kittel, John Wiley & Sons, Inc., 1956; especially, Chapter 1, "The Description of Crystal Structures," and Chapter 11, "Band Theory of Solids."

(b) Book, An Introduction to Semiconductors, by W. C. Dunlap, Jr., John Wiley & Sons, Inc., 1957; especially, Chapter 11, "Properties of the Elemental Semiconductors."

(c) Article, "The Effects of Elastic Deformation on the Electrical Conductivity of Semiconductors," by R. W. Keyes, Solid State Physics, Advances in Research and Applications, vol. 11, 1960, Academic Press, especially, pp. 149–221.

(d) Article, "High Electric Field Effects in Semiconductors," by J. B. Gunn, Progress in Semiconductors, vol. 2, 1957, p. 211.

(e) Article, "Anistropy of Hot Electrons in Germanium" by W. Sasaki et al., Journal of Physics and Chemistry of Solids, vol. 8, 1959, pp. 250–256.

(f) Article, "Anistropy of the Conductivity of Hot Electrons and the Temperature in Germanium," by E.G. S. Paige, Proceedings of the Physical Society, vol. 75, 1960, pp. 174–184.

(g) Article, "Experimental Evidence of Birefringence by Free Carriers in Semiconductors," by K. J. Schmidt-Tiedmann, Physical Review Letters, vol. 7, 1961, pp. 372–374.

The infrared radiation region of the electromagnetic radiation spectrum is particularly suitable for the practice of this invention. Infrared radiation has wavelengths extending from the red end of the visible electromagnetic radiation spectrum a limited distance into the longer wavelengths. This region of the electromagnetic radiation spectrum is becoming of increasing usefulness in both laboratory and commercial applications. It is particularly important for communication of both digital and analog information because sources of coherent infrared radiation have recently become available. Infrared radiation is useful for communication purposes because it does not make a visible trace in the dark and it has considerable penetrating power in an environment which would severely absorb or scatter radiation from the visible spectrum. It is important that the means which causes the alteration of the transmittance of incident infrared radiation not scatter or absorb it unduly.

Two significant ways in which the transmittance of electromagnetic radiation propagating in a solid may be altered for communication purposes in accordance with information are through its polarization and through its amplitude. When incident non-polarized radiation is linearly polarized, the power in the transmitted radiation is less than in the incident radiation, i.e., the transmittance is altered. When the amplitude of incident linearly polarized radiation is altered, the power in the transmitted radiation is altered, i.e., the transmittance is altered.

Prior art discoveries relating to energy distribution of conduction or free electrons in a semiconductor crystal are utilized for the practice of this invention. It has been discovered that a uniaxial stress in certain semiconductor crystals causes deformation of the conduction band structure so that one or more energy valleys of a multivalley constant energy surface is decreased in energy. Free charge carriers then populate preferentially the lowest energy valleys. Consequently, the effective mass of the carriers is anisotropic. It has also been discovered that an electric field applied to a semiconductor crystal causes anisotropic heating of free charge carriers. The carriers in one or more valleys of a multivalley constant energy surface become "hotter" than those in the other valleys. This results in a decrease in the relative carrier population of these valleys with respect to the "cooler" valleys.

It is an object of this invention to provide alteration of transmittance in solids by making the energy distribution of free charge carriers therein anisotropic.

It is another object of this invention to provide apparatus and method for altering the transmittance of electromagnetic radiation propagating in a solid by application thereto of alteration means which establishes free charge carriers therein in selected ones of several energy valleys.

It is another object of this invention to provide apparatus and method for altering the transmittance of electromagnetic radiation propagating in a monocrystalline semiconductor solid by application of uniaxial stress thereto which establishes free charge carriers therein in selected ones of several energy valleys.

It is another object of this invention to provide apparatus and method for altering the transmittance of electromagnetic radiation propagating in a monocrystalline semiconductor solid by application of modulating means thereto which establishes free charge carriers therein in selected ones of several energy valleys.

It is another object of this invention to provide apparatus and method for altering the transmittance of electromagnetic radiation propagating in a monocrystalline solid by application of microwave radiation thereto which establishes free charge carriers therein in selected ones of several energy valleys.

It is another object of this invention to provide apparatus and method for linearly polarizing electromagnetic radiation propagating in a monocrystalline semiconductor solid by application of uniaxial stress to the solid to establish free charge carriers therein in selected ones of several energy valleys.

It is another object of this invention to provide apparatus and method for modulating the amplitude of electromagnetic radiation propagating in a monocrystalline semiconductor solid by application of microwave radiation to the solid to establish free charge carriers therein in selected ones of several energy valleys.

It is another object of this invention to provide apparatus and method for modulating the amplitude of electromagnetic radiation propagating in a monocrystalline semiconductor solid by application thereto of uniaxial stress and microwave radiation.

The foregoing and other objects, features and advantage of the invention will be apparent from the following more particular description of preferred embodiments of the invention, as illustrated in the accompanying drawings.

In the drawings:

FIGURE 1 is a schematic diagram illustrating two embodiments of the invention. In one embodiment, polarization of incident infrared radiation is obtained through application of stress to a monocrystalline semiconductor solid; and in the other embodiment, amplitude modulation of incident linearly polarized infrared radiation is obtained by application of microwave radiation to another monocrystalline semiconductor solid.

FIGURE 2 is a schematic diagram illustrating the practice of this invention with an embodiment in which both stress and microwave radiation are applied to a monocrystalline semiconductor solid to obtain amplitude modulation of infrared radiation incident thereon.

FIGURE 3 is a line diagram illustrating the energy distribution of free electrons in silicon in several energy valleys represented by constant energy surfaces.

FIGURE 4 is a line diagram illustrating the energy distribution of free electrons in germanium in several energy valleys represented by constant energy surfaces.

In the practice of this invention, alteration of the transmittance of electromagnetic radiation propagating in a solid, the radiation having wavelength longer than an energy gap in the solid, is obtained by changing the energy distribution of free charge carriers therein in selected ones of several energy valleys in the solid. The change may be obtained by application of either stress or electric field to the solid.

In the practice of one feature of the invention, stress is applied to a monocrystalline semiconductor solid in a preferred crystal direction to establish free charge carriers therein in selected ones of several energy valleys. Electromagnetic radiation propagating in the solid, the radiation having wavelength longer than the energy gap in the solid, is linearly polarized by selective absorption in the solid of all but one direction of the polarization components.

In the practice of another feature of the invention, a time varying electric field is applied to a monocrystalline semiconductor solid to establish free charge carriers therein in selected ones of several energy valleys. Linearly polarized electromagnetic radiation propagating in the solid, the radiation having wavelength longer than the energy gap in the solid, is amplitude modulated by absorption thereof in the solid in accordance with the amplitude of the electric field. In particular, the time varying electric field is linearly polarized microwave radiation.

In the practice of another feature of the invention amplitude modulated electromagnetic radiation is obtained from non-modulated electromagnetic radiation, propagating in a solid with a plurality of energy valleys by application of stress and time varying electric field to the solid in preferred directions.

In the practice of this invention, the crystal direction in which stress is applied to a monocrystalline semiconductor solid is related to the band structure of the crystal. Illustratively, when stress is utilized to effect an anisotropic distribution of electron energies for polarizing infrared radiation: for n-type silicon, stress is applied in a [100] crystal direction, and the infrared radiation is applied in the perpendicular [010] crystal direction; for n-type germanium, stress is applied in a [111] crystal direction, and infrared radiation is applied in the perpendicular [2$\overline{1}\overline{1}$] crystal direction.

In the practice of this invention, when linearly polarized microwave radiation is utilized to effect an anisotropic distribution of electron energies in a monocrystalline solid to obtain amplitude modulation of incident linearly polarized infrared radiation, the incidence and polarization vector of the infrared and electric field of the microwave radiation are applied to the solid in selected crystallographic directions. Illustratively, for n-type silicon, the infrared radiation is linearly polarized along a [010] crystal direction and is incident along any direction perpendicular to [010] direction, and the microwave electric field vector is applied to the same [010] direction; for n-type germanium, the microwave electric field vector is applied along a [111] direction and the infrared radiation is applied in any perpendicular direction with its polarization vector in the [111] direction.

Uniaxial stress applied to a monocrystalline semiconductor solid for the practice of this invention causes a deformation of the band structure such that one or more energy valleys become lower in energy relative to the other valleys. Consequently, the other energy valleys are depopulated with the free electrons therein moving to the lower energy valleys. An electric field established in a monocrystalline semiconductor solid for the practice of this invention heats free electrons anistropically such that they move to one or more of the valleys from the other valleys. In both instances, the average effective mass of the electrons is no longer isotropic. The change in effective mass is used to alter the transmittance of electromagnetic radiation propagating in the semiconductor solid. The change is effective mass is used to absorb selectively all but one polarization direction of initially non-polarized electromagnetic radiation; and it is used to modulate the absorption of initially polarized electromagnetic radiation.

In order to obtain microwave modulation of electromagnetic radiation by the practice of this invention, the monocrystalline semiconductor solid preferably is maintained at a low temperature, e.g., 78° K. However, the temperature must be higher than that at which the free charge carriers "freeze"; e.g., 50° K. Although polarization of electromgnaetic radiation may be obtained at room temperature in a monocrystalline semiconductor solid by the practice of this invention, better operational results are obtained when the solid is at lower temperature.

If heating of a monocrystalline solid in the practice of this invention for microwave modulation is a problem, pulse operation is desirable. In pulse operation, the microwave radiation is on for a period and off for a period, e.g., on for 10 microseconds and off for 100 microseconds.

Two embodiments of the invention will be described with reference to FIG. 1.

For one embodiment, monocrystalline semiconductor solid 12 is shown in the form of a rectangular parallelepiped. Uniaxial stress $\vec{S}$ is applied thereto in the y-direction. Semiconductor solid 12 is utilized to obtain linearly polarized transmitted infrared radiation 18 from nonpolarized incident infrared radiation 11 applied in the z-direction. For another embodiment, linearly polarized infrared radiation 18 is applied to monocrystalline semi-conductor solid 22 in the z-direction and microwave modulated infrared radiation 26 is obtained therefrom in the z-direction. Linearly polarized microwave radiation 24 is applied to semiconductor solid 22 in the x-direction with its electric field $\vec{E}$ being in the y-direction.

In greater detail (FIG. 1) for a polarizer embodiment, nonpolarized infrared radiation 11, with polarization vectors $\vec{P}_1$ and $\vec{P}_2$, from infrared radiation source 9 is applied to monocrystalline semiconductor solid 12 in the z-direction. A uniaxial stress $\vec{S}$ is applied to solid 12 in the y-direction by compression device 13. Compression device 13 has screw member 14 supported by projection 15. Bearing plate 16 of compression device 13 is positioned against the upper surface of solid 12 and bearing plate 17 thereof is positioned adjacent the lower surface of solid 12. The uniaxial stress $\vec{S}$ is applied to solid 12 by causing the screw member 14 to press against bearing member 16. Thus, solid 12 is in compression between bearing members 16 and 17. As a result of selective absorption of polarization vector $\vec{P}_2$ of infrared radiation 11, the transmitted infrared radiation 18 is linearly polarized with polarization vector $\vec{P}_1$.

Illustratively, for the polarizer embodiment of FIG. 1, when the semiconductor crystal 12 is n-type silicon, nonpolarized infrared radiation 11 is incident thereon along a [010] crystal direction and a uniaxial stress $\vec{S}$ is applied thereto along a perpendicular [100] crystal direction. When the semiconductor crystal 12 is n-type germanium, the non-polarized infrared radiation 11 is incident thereon along a [2$\bar{1}\bar{1}$] direction with uniaxial stress $\vec{S}$ applied along a perpendicular [111] crystal direction.

In greater detail (FIG. 1) for a modulator, linearly polarized infrared radiation 18 with its polarization vector $\vec{P}_1$ in the y-direction, is applied to semiconductor solid 22 in the z-direction. Linearly polarized microwave radiation 24 with its electric field vector $\vec{E}$ in the y-direction is applied to solid 22 in the x-direction. The microwave modulated infrared radiation 26 is transmitted from solid 22 in the z-direction. When the semiconductor crystal 22 is n-type silicon, the linearly polarized infrared radiation 18 is incident on solid 22 along a [010] direction with its polarization vector $P_1$ in the [100] direction. The microwave radiation 24 is incident on the silicon crystal 22 along the [010] direction with its electric field vector $\vec{E}$ in the [100] direction. When the semiconductor crystal 22 is n-type germanium, the microwave radiation 24 is incident there with its electric field vector $\vec{E}$ is the [111] direction and the infrared radiation 18 is applied to the germanium crystal 22 with its polarization vector $\vec{P}_1$ in the [111] direction.

The embodiment 30 of this invention illustrated in FIG. 2 utilizes both uniaxial stress $\vec{S}$ and microwave radiation electric field $\vec{E}$ to obtain transmitted modulated linearly polarized infrared radiation 26 from incident nonpolarized infrared radiation 11 applied to mono-crystalline semiconductor solid 31. In greater detail:

(a) For n-type silicon crystal 31, the incident nonpolarized infrared radiation 11 is applied in the [100] direction, the uniaxial stress $\vec{S}$ is applied in [010] direction, and the electric field $\vec{E}$ of the microwave radiation 24 is applied in the [100] direction.

(b) For n-type germanium crystal 31, the incident nonpolarized infrared radiation 11 is applied in the [2$\bar{1}\bar{1}$] direction, the uniaxial stress is applied in the [111] direction and the electric field of the microwave radiation 24 is applied in the [2$\bar{1}\bar{1}$] direction.

The nature of the distribution of electron energies effected both by strain and electric field in a semiconductor crystal will be described with reference to FIGS. 3 and 4 which are illustrative of the constant energy surfaces for n-type silicon and n-type germanium, respectively. FIG. 3 illustrates the six constant energy surfaces of n-type silicon disposed on the momenta axes $k_x$, $k_y$, $k_z$. FIG. 4 illustrates the ellipsoids of n-type germanium in a simplified manner. FIG. 4 shows the projections of the four ellipsoids upon the [001]–[100] plane. Actually, for n-type germanium there are eight half ellipsoids. A reference in this regard is the book Semiconductor Device Physics by A. Nussbaum, Prentice Hall Inc., 1962, especially page 207.

In the terms of the band theory of solids, the energies of conduction electrons are discretely associated with vectors in momentum space, i.e., a space whose axes are nominally $k_x$, $k_y$ and $k_z$ in comparison with a normal physical space characterized in terms x, y and z. The range of energies near a minimum are in a particular volume in k-space which is referred to as a "valley." The constant energy surfaces near this minimum are usually ellipsoids in k-space and characterize the properties of the carriers near the valley. For each energy, there is a different set of ellipsoids with similar properties. Hence, the constant energy surfaces shown in FIGS. 3 and 4 are merely exemplary of families of surfaces.

The manner in which a uniaxial strain effects an anisotropic distribution of electrons in a semiconductor crystal will be clarified in terms of the band theory of solids. The uniaxial strain in the semiconductor causes a deformation of the conduction band to produce relative shifts in energy between various energy valleys in the conduction band. As a consequence, one or more energy valleys have a lower energy than the other valleys and the electrons depopulate the higher energy valleys and populate the lower energy valleys. Hence, the property of the crystals as it, affects incident infrared radiation is determined by the nature of the populated valley or valleys. The average effective mass of the anisotropically distributed electrons is different than when they are more uniformly distributed throughout the energy valleys. Since the effective mass of the valleys is anisotropic, and as the absorption constant of conduction electrons for infrared radiation is dependent on the effective mass of the electrons, the absorption constant is anisotropic and therefore polarization dependent. As the absorption constant depends reciprocally on the effective electron mass, it varies for different directions of polarization. Illustratively, for n-type germanium it may vary by a factor of 20. Thus, only one direction of polarization is not substantially absorbed in the strained germanium crystal.

For a large n-type doping, a semiconductor crystal of n-type silicon or n-type germanium has an absorption constant which depends mainly on the absorption of the conduction electrons. Thus, a uniaxially strained crystal is a dichroic material which permits transmission of only one direction of polarization of incident infrared radiation. The incident infrared radiation must have wavelength longer than the band gap radiation for the semiconductor crystal, i.e., 1.7 micron for germanium and 1.1 micron for silicon. Although the relative transmission for two directions of polarization is independent of the wavelength of the incident infrared radiation, the total transmission of the infrared radiation is somewhat dependent on the wavelength of the radiation.

While the invention has been particularly shown and described with reference to preferred embodiments thereof, it will be understood by those skilled in the art that various changes in form and details may be made therein without departing from the spirit and scope of the invention.

What is claimed is:
1. Apparatus for polarizing electromagnetic radiation propagating in a solid comprising:
- a monocrystalline semiconductor solid of n-type germanium having a plurality of energy valleys of free charge carriers;
- means for applying infrared radiation to said solid in a [2$\bar{1}\bar{1}$] crystal direction, said radiation having wavelength longer than the energy gap in said solid; and
- means for linearly polarizing said infrared radiation by selectively absorbing in the solid all but one direction of the polarization components thereof by applying uniaxial stress to said solid in a [111] crystal direction for populating preferentially selected ones of said energy valleys with said free charge carriers.

2. Apparatus for polarizing electromagnetic radiation propagating in a solid comprising:
- a monocrystalline semiconductor solid of n-type silicon having a plurality of energy valleys of free charge carriers;
- means for applying infrared radiation to said solid in a [010] crystal direction, said radiation having wavelength longer than the energy gap in said solid; and
- means for linearly polarizing said infrared radiation by selectively absorbing in the solid all but one direction of the polarization components thereof by applying uniaxial stress to said solid in a [100] crystal direction for populating preferentially selected ones of said energy valleys with said free charge carriers.

3. Apparatus for modulating electromagnetic radiation propagating in a solid comprising:
- a monocrystalline semiconductor solid of n-type germanium having a plurality of energy valleys of free charge carriers;
- means for applying linearly polarized infrared radiation with the polarization vector thereof in a [111] crystal direction to said solid in a crystal direction perpendicular to said polarization vector, said radiation having wavelength of energy longer than the energy gap in said solid; and
- means for modulating the amplitude of said infrared radiation propagating in said solid by selectively absorbing said radiation therein by applying linearly polarized microwave radiation to said solid with the microwave electric field vector thereof in a [111] crystal direction for heating preferentially said free charge carriers in selected ones of said energy valleys.

4. Apparatus for modulating electromagnetic radiation propagating in a solid comprising:
- a monocrystalline semiconductor solid of n-type silicon having a plurality of energy valleys of free charge carriers;
- means for applying linearly polarized infrared radiation with the polarization vector thereof in a [010] crystal direction to said solid in a crystal direction perpendicular to said polarization vector, said radiation having wavelength longer than the energy gap in said solid; and
- means for modulating the amplitude of said infrared radiation propagating in said solid by selectively absorbing therein said radiation by applying linearly polarized microwave radiation to said solid with the microwave electric field vector thereof in a [010] crystal direction for heating preferentially said free charge carriers in selected ones of said energy valleys.

5. Apparatus for polarizing and modulating electromagnetic radiation propagating in a solid comprising:
- a monocrystalline n-type semiconductor solid selected from the group consisting of germanium and silicon having a plurality of energy valleys of free charge carriers;
- means for applying infrared radiation to said solid in a first preferred crystal direction, said radiation having wavelength longer than the energy gap in said solid;
- means for linearly polarizing said infrared radiation by selectively absorbing in the solid all but one direction of the polarization components thereof by applying uniaxial stress to said solid in a second preferred crystal direction perpendicular to said first preferred direction for populating preferentially selected ones of said energy valleys with said free charge carriers; and
- means for modulating the amplitude of said linearly polarized radiation by selectively absorbing said radiation therein by applying a time varying electric field to said solid in a third preferred crystal direction for heating preferentially said free charge carriers in selected ones of said energy valleys.

6. Apparatus for altering the transmittance of electromagnetic radiation propagating in a solid comprising:
- a monocrystalline semiconductor solid selected from the group consisting of germanium and silicon having a plurality of energy valleys of free charge carriers;
- means for applying infrared radiation to said solid in a first preferred crystal direction, said radiation having wavelength of energy longer than the energy gap in said solid; and
- means for applying a stress to said solid in a second preferred crystal direction for selectively absorbing said radiation in said solid by populating preferentially selected ones of said energy valleys with said free charge carriers.

7. Apparatus for altering the transmittance of electromagnetic radiation propagating in a solid comprising:
- a monocrystalline semiconductor solid having a plurality of energy valleys of free charge carriers;
- means for applying electromagnetic radiation in a given optical wavelength range longer than the energy gap in said semiconductor to said solid in a first preferred crystal direction; and
- means for selectively absorbing in said solid all but one direction of the polarization components of said radiation by populating preferentially selected ones of said energy valleys with said free charge carriers by applying uniaxial stress to said solid in a second preferred crystal direction.

8. Apparatus for altering the transmittance of electromagnetic radiation propagating in a solid comprising:
- a monocrystalline semiconductor solid with a plurality of energy valleys of free charge carriers;
- means for applying electromagnetic radiation to said solid in a first preferred crystal direction, said radiation being linearly polarized in a second preferred crystal direction and being in a given optical wavelength range longer than the energy gap in said semiconductor; and
- means for modulating the amplitude of said radiation by selectively absorbing said radiation in said solid by applying a time varying electric field to said solid in a third preferred crystal direction for heating preferentially said free charge carriers in selected ones of said energy valleys.

9. Apparatus for polarizing and modulating electromagnetic radiation propagating in a solid comprising:
- a monocrystalline semiconductor solid of n-type germanium having a plurality of energy valleys of free charge carriers;
- means for applying infrared radiation to said solid in a $[2\bar{1}\bar{1}]$ crystal direction, said radiation having wavelength longer than the energy gap in said solid;
- means for linearly polarizing said infrared radiation by selectively absorbing in said solid all but one direction of the polarization components of said radiation by applying uniaxial stress to said solid in a [111] crystal direction for populating preferentially selected ones of said energy valleys with said free charge carriers; and
- means for modulating the amplitude of said linearly polarized infrared radiation propagating in said solid by selectively absorbing said radiation therein by applying linearly polarized microwave radiation to said solid with the microwave electric field vector in a $[2\bar{1}\bar{1}]$ crystal direction for heating preferentially said free charge carriers in selected ones of said energy valleys.

10. Apparatus for polarizing and modulating electromagnetic radiation propagating in a solid comprising:
- a monocrystalline solid of n-type silicon having a plurality of energy valleys;
- means for applying infrared radiation to said solid in a [100] crystal direction, said radiation having wavelength longer than the energy gap in said solid;
- means for linearly polarizing said infrared radiation by selectively absorbing in said solid all but one direction of the polarization components of said radiation by applying uniaxial stress to said solid in a [010] crystal direction for populating preferentially selected ones of said energy valleys with said free charge carriers; and
- means for modulating the amplitude of said linearly polarized infrared radiation propagating in said solid by selectively absorbing said radiation therein by applying linearly polarized microwave radiation to said solid with the microwave electric field vector in a [100] crystal direction for heating preferentially said free charge carriers in selected ones of said energy valleys.

11. Apparatus for altering the transmittance of electromagnetic radiation propagating in a solid comprising:
- a monocrystalline semiconductor solid selected from the group consisting of germanium and silicon having a plurality of energy valleys of free charge carriers;
- means for applying infrared radiation to said solid in a first preferred crystal direction, said radiation having wavelength of energy longer than the energy gap in said solid; and
- means for applying an electric field vector to said solid in a second preferred crystal direction for selectively absorbing said radiation in said solid by populating preferentially selected ones of said energy valleys with said free charge carriers.

References Cited

UNITED STATES PATENTS

| | | | |
|---|---|---|---|
| 3,126,485 | 3/1964 | Ashkin et al. | 350—160 |
| 3,183,359 | 5/1965 | White | 250—199 |

JEWELL H. PEDERSEN, *Primary Examiner.*

R. L. WIBERT, *Assistant Examiner.*

U.S. Cl. X.R.

350—1, 160; 332—7.51